CHARLES DEAVS.

Improvement in Chucks for Screw Cutting.

No. 121,340.  Patented Nov. 28, 1871.

Witnesses
Fred Hayner
Benj. T Sharp.

Charles Deavs

UNITED STATES PATENT OFFICE.

CHARLES DEAVS, OF NEW YORK, N. Y., ASSIGNOR TO THE ARCHER & PANCOAST MANUFACTURING COMPANY, OF SAME PLACE.

IMPROVEMENT IN CHUCKS FOR SCREW-CUTTING.

Specification forming part of Letters Patent No. 121,340, dated November 28, 1871.

*To all whom it may concern:*

Be it known that I, CHARLES DEAVS, of the city, county, and State of New York, have invented a new and Improved Chuck; and I do hereby declare that the following is a full, clear, and exact description thereof, reference being had to the accompanying drawing forming a part of this specification.

This invention consists in a chuck of novel construction, which may rotate in either direction without any tendency to release its gripe on the article chucked in it, and can be operated to free or gripe the work without stopping the lathe on which it is used.

Figure 1:
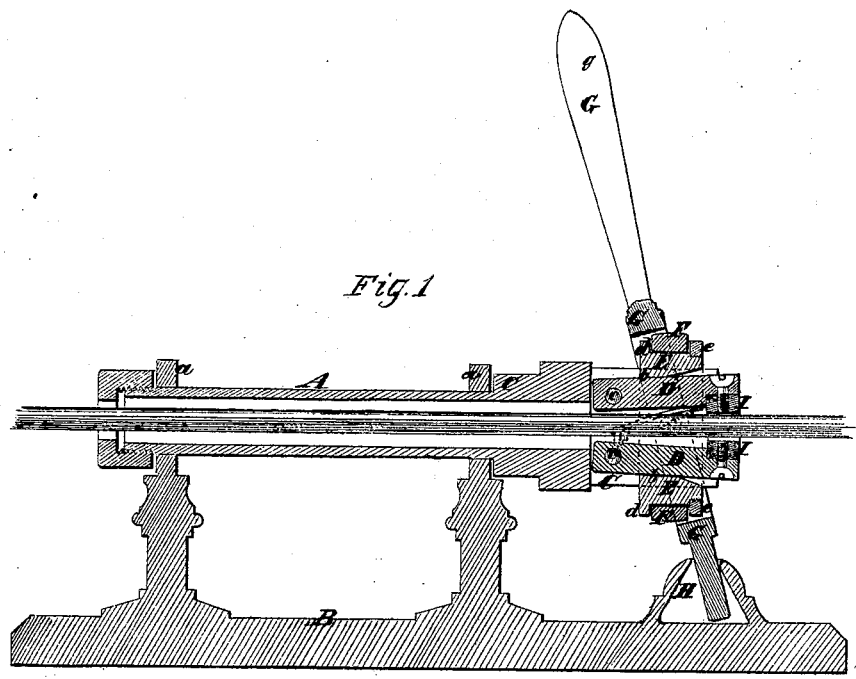
Figure 2:
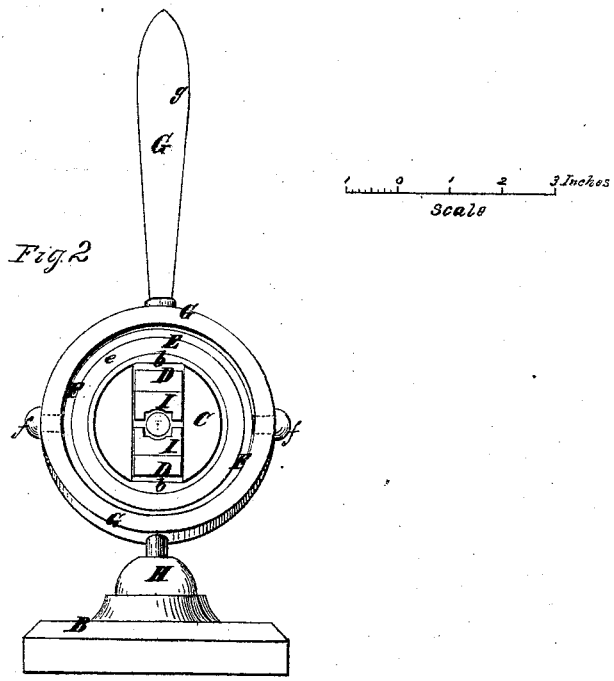

In the accompanying drawing, Figure 1 is a longitudinal section of the mandrel of a lathe having my chucks applied, and Fig. 2 is an end view of the same.

Similar letters of reference indicate corresponding parts in both figures.

C is the body of the chuck, attached in the usual or any suitable manner to the lathe-spindle, which is hollow throughout its entire length, and is supported in the usual bearings $a$ $a$ on the head-stock B. This body C has a central hole through it, and is mortised right across its outer end to a sufficient depth for the reception of the jaws D D of the chuck. These jaws are pivoted by pins or pivots $c$ $c$ opposite each other in the said mortised end of the body C in such position that their outer sides are not quite flush with the exterior of said body and have an inward inclination toward their pivoted ends. Attached to each jaw is a spring, which presses against the opposite jaw in such manner that the jaws are thereby kept open when not otherwise controlled. To the adjacent sides of the forward portion of these jaws lining pieces I I are secured in such manner that they may be easily removed to permit the substitution of others for different kinds of work. E is a clamping collar, surrounding and capable of sliding upon the exterior of the body C, having a flange, $d$, formed on its back and a removable flange, $e$, screwed to its front, the space between the flanges forming an annular groove, in which a loose ring, F, is received. In opposite sides of the interior of this collar E are two projections, $b$ $b$, that enter into the mortise in the body A and bear against the outer sides of the jaws D D. G is a yoked lever, for which a fulcrum, H, is provided on the stock B, and the yoke of which is pivoted to the ring F by two screws, $f$ $f$, arranged horizontally opposite the center of the body C of the chuck.

To insert a piece of work in the chuck the yoked lever G is slid back by the operator taking hold of its handle $g$ so as to incline backward, as shown in Fig. 1, thereby bringing the projections $b$ $b$ over the rear portion of the jaws D D, near their pivots, where they have no effect on them. The work is then inserted and the yoked lever pulled forward, thereby drawing the collar E forward and sliding its projections $b$ $b$ over the inclined backs of the jaws D D with a wedge-like action, and so forcing the jaws toward each other that their lining pieces firmly gripe and hold the work. The lining pieces can be changed for others to facilitate the holding of different kinds of work.

The great advantages which this chuck possesses over the chucks now in use are that it can be rotated in either direction without loosening the work, the collar E turning within the ring F; and it can be operated to hold or permit the removal of the work without stopping the lathe. Besides these advantages it is simple and effective, and easily operated in other respects.

What I claim as my invention, and desire to secure by Letters Patent, is—

The combination of the mortised body C, the pivoted jaws D D, the sliding collar E with its projections $b$ $b$, the ring F, and yoke-lever G, the whole arranged for operation substantially as and for the purpose set forth.

CHARLES DEAVS.

Witnesses:
HENRY T. BROWN,
FRED. HAYNES.